United States Patent [19]

Kataoka et al.

[11] Patent Number: 4,939,191

[45] Date of Patent: Jul. 3, 1990

[54] HIGH STRENGTH CURED CEMENT ARTICLE AND PROCESS FOR MANUFACTURING THE SAME

[75] Inventors: Nobuhiro Kataoka; Hideaki Igarashi; Masanori Ohshima, all of Ube, Japan

[73] Assignee: Ube Industries, Ltd., Ube, Japan

[21] Appl. No.: 156,710

[22] Filed: Feb. 17, 1988

[30] Foreign Application Priority Data

Feb. 20, 1987 [JP] Japan .................................. 62-35735

[51] Int. Cl.$^5$ ........................ C04B 24/24; C04B 41/62
[52] U.S. Cl. ............................................ 524/5; 524/2; 106/692; 106/727
[58] Field of Search ................ 524/5, 2; 106/90, 104

[56] References Cited

U.S. PATENT DOCUMENTS

| | | | |
|---|---|---|---|
| 4,127,548 | 11/1978 | Alexander | 524/5 |
| 4,189,415 | 2/1980 | Eck et al. | 524/5 |

FOREIGN PATENT DOCUMENTS 0127375 12/1983 Japan .

*Primary Examiner*—Joseph L. Schofer
*Assistant Examiner*—Tom Weber
*Attorney, Agent, or Firm*—Frishauf, Holtz, Goodman & Woodward

[57] ABSTRACT

A cured cement article containing therein an organic polymer treated with an isocyanate compound has a high flexural strength and high water resistance. The cured cement can be prepared by impregnating a cured cement article containing therein a water-soluble polymer or a water-dispersible polymer with an isocyanate compound.

19 Claims, No Drawings

HIGH STRENGTH CURED CEMENT ARTICLE AND PROCESS FOR MANUFACTURING THE SAME

BACKGROUND OF THE INVENTION

1. Field of the Invention

This invention relates to a high strength cured cement article, and further relates to a process for manufacturing the same.

2. Description of Prior Art

U.S. Pat. No. 4,353,748 describes a high strength hydraulic cured cement product showing an extremely high flexural strength, which is manufactured by kneading an aqueous mixture of a hydraulic cement, water and a water-soluble polymer such as hydroxypropyl methyl cellulose using a kneader such as a mixing roll under high shear force to give a homogeneous mixed product having a reduced amount of water, and then curing the mixed product.

U.S. Pat. No. 4,410,366 describes a high strength hydraulic cured cement product showing an extremely high flexural strength, which is manufactured by kneading an aqueous mixture of a hydraulic cement, water and a water-soluble polymer such as a partially hydrolyzed polyvinyl acetate using a kneader such as a mixing roll under high shear force to give a homogeneous mixed product having a reduced amount of water, and then curing the mixed product.

U.S. Pat. Nos. 4,070,199 and 4,240,840 describe a high strength hydraulic cured cement product showing an extremely high flexural strength, which is manufactured by kneading an aqueous mixture of a hydraulic cement, water and a water-dispersible polymer using a mixing roll under high shear force to give a homogeneous mixed product having a reduced amount of water, and then curing the mixed product.

The cured cement product generally has a flexural strength of not less than 350 kgf/cm$^2$ and has a smooth surface. Therefore, the cured cement product is employable as a building material and a mechanical element.

However, there is a drawback in the cured cement product from the viewpoint of water resistance (i.e., resistance to water). In more detail, the cured cement product having the polymer is apt to show swelling and reduction of its mechanical strength, because the cured product contains a water-soluble or water-dispersible polymer which absorbs water even after being cured.

SUMMARY OF THE INVENTION

An object of the present invention is to provide a high strength cured cement article, which has an improved water resistance.

Another object of the invention is to provide a high strength cured cement article containing an organic polymer therein, which has an improved water resistance.

A further object of the invention is to provide an advantageous process for the preparation of a water-resistant high strength cured cement article containing an organic polymer therein.

There is provided by the present invention a cured cement article which contains therein an organic polymer having been treated with an isocyanate compound.

The above-mentioned cured cement article contains the organic polymer having one or more urethane bondings, urea bondings, amide bondings, biuret bondings, allophanate bondings and/or acylurea bondings.

The above-mentioned article can be favorably prepared by a process which comprises impregnating a cured cement article containing therein an organic polymer with an isocyanate compound to cause a reaction between at least a portion of the polymer and the isocyanate compound.

The above-mentioned article can also be prepared by a process which comprises curing a composition of a hydraulic cement, a water-soluble organic polymer or a water-dispersible polymer such as those in the form of a polymer emulsion or a polymr latex, an isocyanate compound and water.

The high strength cured cement article of the present invention can be utilized for manufacturing an exterior member of a building material and an interior member, particularly for members which require high water resistance (e.g., floor, members around waterworks). The high strength cured cement article of the invention can be also utilized for manufacturing mechanical members which require high precision, because the cured cement article of the invention hardly changes its size, that is, the cement article has a high resistance to water.

The high strength cured cement article may be formed into an optional shape such as a plate, or may be formed to have an embossed surface. Further, the high strength cured cement article of the invention can be improved in hardness, stability or decorativeness by coating or printing various material on its surface.

DETAILED DESCRIPTION OF THE INVENTION

There is no specific limitation with respect to a hydraulic cement employed for manufacturing a high flexural strength cured cement article of the present invention, and various known hydraulic cements can be used. Examples of the hydraulic cements include Portland cements such as ordinary Portland cements, rapid hardening Portland cements, extra-rapid hardening Portland cements, moderate heat Portland cements, sulfate-resisting Portland cements or white cements; blended cements such as silica cements, Portland blast furnace cements, or fly ash cements; special cements such as extra-quick setting cements, or alumina cements; and calcium sulfate hemihydrate cements such as hemihydrate gypsum cements. Commercially available hydraulic cements can be used with no processing, or can be employed after adjusting their grain sizes.

An organic polymer such as water-soluble polymer or a water-dispersible polymer in the form of a polymer emulsion or a polymer latex is employed to obtain a high flexural strength cured cement article of the invention. The water-soluble polymer or water-dispersible polymer is employed to increase the kneading efficiency of the hydraulic cement, or to increase the molding efficiency of the hydraulic cement composition. Further, the water-soluble polymer or the water-dispersible polymer is utilized for improving the mechanical characteristics of the resulting cured hydraulic cement article. There is no specific limitation with respect to the water-soluble polymer and the water-dispersible polymer. Examples of the water-soluble polymers include water-soluble proteins, water soluble starchs, water-soluble cellulose derivatives, partially hydrolyzed polyvinyl acetate, polyvinyl alcohol, polyacrylic soda, polyethylene oxide, polyacrylamide, cross-linked acrylic acid polymer, water-soluble urea resin, water-soluble melamine resin, water-soluble epoxy resin, water-soluble polyester, water-soluble phenolformaldehyde resin, water-soluble amine neutralization alkyd resin, polyvinyl methylether, polyvinylpyrrolidone, polystyrene sulfonic acid, and quaternary polyvinyl pyridine. Examples of the water-dispersible polymer include those in the form of rubber latex, acrylic emulsion, vinyl acetate emulsion, vinyl chloride emulsion, ethylene-vinyl acetate emulsion, polypropylene emulsion, epoxy resin emulsion, polyurethane emulsion, polyamide emulsion, or bituminous emulsion. These polymers can be used singly or in combination. In view of the degree of improvement of water resistance of the resulting cured cement article, the water-soluble polymer is preferred, and the partially hydrolyzed polyvinyl acetate is most preferred.

The compounding ratio of the water-soluble polymer or water-dispersible polymer preferably is in the range of 0.1 to 20 wt. % based on the amount of the hydraulic cement, more preferably 0.3 to 10 wt. % (the amount is a total amount of the hydraulic cement and a filler in the case that a portion of the cement is replaced with the filler). In the case that the compounding ratio is less than 0.1 wt. %, or more than 20 wt. %, the flexural strength may be not satisfactorily high.

The amount of water, although it differs depending on the amount of the water-soluble or water-dispersible polymer and other additives, is preferably not more than 30 wt. % based on the amount of the hydraulic cement. In the case that the amount of water is more than 30 wt. %, the flexural strength may be not satisfactorily high.

In the present invention, the isocyanate compound is used to obtain the high flexural strength and water resistance cured cement article. The isocyanate compound may react with the organic polymer to produce a urethane bonding, a urea bonding, an amide bonding, a biuret bonding, an allophanate bonding or an acylurea bonding. The isocyanate compound may also react with the other components or otherwise undergoes polymerization reaction. Using the isocyanate compound, the hydraulic cured cement article is provided with improved water resistance. A portion of unreacted isocyanate compound may remain in the hydraulic cured cement article. The isocyanate compound may be caused to react with the water-soluble or water-dispersible polymer, whereby the water absorptiveness of the water-soluble or water-dispersible polymer may be reduced, or caused to react with the hydraulic cement or the hydraulic cementitious hydrate, whereby the absorptiveness of the hydraulic cement or the hydraulic cementitious hydrate may be reduced. The products produced by the above reactions and/or by the polymerization reaction may plug voids of the cured cement article. Accordingly, the water-resistance of the cured hydraulic cement article can be improved. There is no specific limitation with respect to the isocyanate compounds. Examples of the isocyanate compounds include monoisocyanate compounds such as phenylisocyanate, p-chlorophenylisocyanate, o-chlorophenylisocyanate, m-chlorophenylisocyanate, 3,4-dichlorophenylisocyanate, 2,5-dichlorophenylisocyanate., methylisocyanate, ethylisocyanate, n-butylisocyanate, n-propylisocyanate, octadecylisocyanate; diisocyanate compounds such as 2,4-tolylene diisocyanate, 2,6-tolylene diisocyanate, 4,4'-diphenylmethane diisocyanate, dianisidine diisocyanate, o-toluilene diisocyanate, hexamethylene diisocyanate, xylene diisocyanate, 1,5-naphthalene diisocyanate, transvinylene diisocyanate, lysine diisocyanate, isophorone diisocyanate, dimethyl diisocyanate, trimethylhexamethylene diisocyanate, 3,3'-dimethyldiphenylmethane-4,4'-diisocyanate, isopropyridine bis(4-cyclohexylisocyanate), hydrogenated 4,4'-diphenylmethane diisocyanate, hydrogenated tolylenediisocyanate; triisocyanate compounds such as triphenylmethane triisocyanate, tris(4-phenylisocyanate thiophosphate); polyisocyanate compounds having four or more isocyanates groups such as polymethylene polyphenylisocyanate; their dimers such as N,N'-(4,4'-dimethyl-3,3'-diphenyldiisocyanate)-uredione; their trimers such as 4,4',4''-trimethyl-3,3',3''-triisocyanate-2,4,6-triphenylcyanurate; their derivatives such as carbodiimide modified isocyanate; compounds obtained by reacting the isocyanate compound with polyol such as polyurethane prepolymer; blocked isocyanates (block agent: phenol, etc.); and their mixtures such as crude tolylenediisocyanate.

The isocyanate compound may be selected from the viewpoints of the requirement of the resulting flexural strength or the water resistance of the cured cement articles, the requirements involved in the manufacturing stage and/or the other requirements.

In the case that the weather resistance is required, aliphatic isocyanates such as hexamethylene diisocyanate, and hydrogenated aromatic isocyanates such as hydrogenated tolylenediisocyanate are preferably used, because such isocyanates are resistant to yellowing by light. In the case that heat resistance is required, an aromatic isocyanate such as tolylene diisocyanate and trimers of isocyanate compounds showing a high decomposition temperature is preferably used. In the case that the irritation of the isocyanate compound should be avoided, 4,4'-diphenylmethane diisocyanate, polyisocyanate, isocyanate compound derivatives, polyurethane prepolymer and blocked isocyanates having a relatively low vapor pressure are preferably used.

The compounding ratio of the isocyanate compound can be in the range of 0.1 to 32 wt. % based on the amount of the hydraulic cement, preferably 0.4 to 21 wt. %. If the compounding ratio is less than 0.1 wt. %, or more than 32 wt. %, the water resistance may be not satisfactory.

From another viewpoint, the isocyanate compound is preferably used in an amount of 10 to 300 weight % per the amount of the polymer, more preferably in an amount of 20 to 300 weight %.

The reaction products of the isocyanate compound such as an isocyanate-reacted organic polymer, a polymerization product of the isocyanate compound and any other product produced by reactions in which the isocyanate compound participate may be distributed uniformly or locally in the cured cement article. Even if the reaction product is locally distributed particularly in the vicinity of the surface of the cured cement article, the water resistance of the cured cement article is very high. The water resistance are affected by the surface conditions of the cured article. The reaction product is preferably distributed in an area which is deeper than 0.1 mm from the surface.

In order to improve the physical properties of the high strength cured cement article, or to improve the physical properties of the water-soluble or water-dispersible polymer, or to improve the workability for manufacturing the high strength cured cement article, various additives can be employed. In order to improve the physical properties of the high strength cured cement article such as uncombustibility, a flame retarder which is generaly used for plastics and rubbers can be used. A smoke-reducing additives can be used to reduce smoking which takes place in the case of burning the cement article. A ultraviolet ray absorbent can be used to improve the weather resistance. In order to improve the physical properties of the water-soluble or water-dispersible polymer, a plasticizer can be used. There is no specific limitation with respect to the plasticizer. Examples of the plasticizers include glycerol, ethyleneglycol and diethyleneglycol. These compounds can be employed singly or in combination. The plasticizer can also be employed to improve the workability for manufacturing the high strength cured cement article. There is no specific limitation with respect to the compounding ratio for these additives. The compounding ratio can be determined by the conventional manner.

An admixture or a filler can be added to the hydraulic cement in addition to the above additives. Examples of the admixtures include water reducing agents such as lignin sulfonate, polyol complex, oxycarboxylic acid, alkylarylsulfate polycondensate, polcondensed triazine compounds, polycondensed aromatic sulfonates, or melamine resin sulfonate; hydration retarders; and hydration accelerators.

Examples of fillers include fine grain type inorganic fillers (including hollow grains) such as fine grain type silicious materials (e.g., silica rock powder, and clay), carbon black, alkali earth metal carbonates (e.g., calcium carbonate, and magnesium carbonate), inorganic oxides (e.g., silicon dioxide, aluminum oxide, titanium dioxide, and zirconium dioxide), or inorganic hydroxides (e.g., calcium hydroxide, magnesium hydroxide, and aluminum hydroxide); fine grain type organic fillers (e.g., spherical silicon); and fibrous fillers such as inorganic fibrous fillers (e.g.. aluminum oxide fiber, alkali resistance glass fiber, carbon fiber, silicon carbide fiber, asbestos, rock wool, and slag wool), organic fibrous fillers (e.g.. nylon fiber, vinylon fiber and polypropylene fiber), or metal fibrous fillers (e.g., steel fiber, and stainless steel fiber). These fillers can be used singly or in combination. The fibrous filler may take a net structure. The mechanical properties such as abrasion resistance or toughness, and the physical properties such as heat conductivity or electric conductivity or vibration damping can be improved by incorporating appropriate fillers into the cement article.

A catalyst can be added to increase the reactivity of the isocyanate compound. The catalyst for polyurethane is preferred. Examples of the catalysts include amines such as 1,4-diazobicyclo(2,2,2)octane, PMDETA, N,N-dimethylcyclohexylamine, N-methyldicyclohexylamine, N,N,N',N'-tetramethyl-1,3-butanediamine, N,N,N',N'-tetramethylpropylenediamine, N,N,N',N'-tetramethylhexamethylenediamine, N-ethylmorpholine, N-methylmorpholine, N,N-dimethylethanolamine N,N-diethylethanolamine, or triethylamine, DBU such as 1,8-diazo-bicyclo[5,4,0]undecene-7 and its salt; metals such as stannous octoate, dibutyltin dilaurate, trimethyltin hydroxyde, dimethyltin dichloride or tin octylate; and other compounds such as butadiene sulfone, inorganic acid, oxy acid, ester of phosphoric acid or boric acid, monobutylphthalate, p-toluenesulfonic acid.

The high strength cured cement article of the invention can be manufactured by the conventional manner as described in the aforementioned patent publications. An example of the known process for manufacturing the high strength cured cement article is described hereinbelow.

The hydraulic cement, the water-soluble or water-dispersible polymer, the isocyanate compound and other additives are mixed with water to prepare a hydraulic cement composition. There is no specific limitation with respect to the mixing procedure, so long as the procedure is performed sufficiently. Powdery solid starting materials except the liquid starting materials such as water are introduced in a mixer (e.g., planetary motion mixer), and then mixed after addition of the liquid starting materials. The resulting mixture is further mixed using a high power mixer. Examples of the high power mixers include a kneader, Banbury mixer, a wet-type pan mixer, a mixing roll, a knett machine, a pug-mill, and a screw extruder. Using these mixers, the amount of the bubbles contained in the hydraulic cement composition is reduced. Even if a reduced amount of water is used, the kneading is sufficiently performed in the mixer. Therefore, the hydraulic cement which has a high flexural strength can be easily obtained. The kneading procedure using the mixer may be performed under reducing pressure.

In the case that the isocyanate compound is a liquid material, the isocyanate compound is introduced by mixing with water or by spraying when the mixing is performed. In the case that the isocyanate compound is a solid material the isocyanate compound is introduced after mixing with the hydraulic cement, or when the mixing procedure is done. Since the isocyanate compound is apt to react with water, the isocyanate compound having a relatively low reactivity is preferred. In the case that a blocked isocyanate is used, the isocyanate is preferably heated to a temperature of not lower than the dissociation temperature of the blocking group at any following stage. The isocyanate compound can be used after dissolving in a hydrophobic solvent having a high boiling point for preventing from reacting with water when it is mixed.

The mixed hydraulic cement composition is shaped into a form of a sheet. The shaping procedure can be performed under reducing pressure. The hydraulic cement composition shaped into the sheet-type is then rolled to have a predetermined thickness by calendering.

The rolled hydraulic cement article is then cured by the conventional manner. Examples of the curing methods include atmospheric curing, moisture curing, curing in water, steam curing and autoclave curing.

Alternatively, the uncrued, rolled hydraulic cement article can be heated under pressure applied to the surface of the sheet before curing in order to accelerate the curing procedure.

The cured hydraulic cement article is then dried at a drying stage. Strength of the cured hydraulic cement article can be increased by drying. There is no specific limitation with respect to the drying procedure. The drying procedure is generally performed under atmospheric condition, or under conditions heated to a temperature of not higher than 100° C.

The time required for heating under pressure, curing and drying is determined in consideration of the natures of the starting materials and the amount thereof. The hydraulic cement article is preferably cured and dried by interposing between porous plates for preventing the cured article from warping.

The obtained cured hydraulic cement article shows a high flexural strength of more than 100 kgf/cm$^2$ (approx. 10 MPa). The cured hydraulic cement article is also improved in the water resistance.

The high strength cured cement article can be manufactured by the following process.

The starting materials and the amount thereof used in this process is similar to those of the above described process for manufacturing of the high strength cured cement article.

This process for manufacturing of the high strength cured cement article differs from the conventional manner with respect ot the manner of addition of the isocyanate compound. In the present process, the isocyanate compound is impregnated in the cured hydraulic cement article or the intermediate product thereof (i.e., uncured hydraulic cement article) which is manufactured by the conventional manner using the starting materials except for using the isocyanate compound. The term of the intermediate product refers to a mixed product, a shaped product, a rolled article or a pre-cured article.

In the present process, since the isocyanate compound is not contained in the starting materials to be mixed, the mixing efficiency increases. Further, the amount of bubbles introduced into the mixture is reduced. Therefore, it enable to give a cured hydraulic cement article having high flexural strength. Furthermore, the reaction products and the inner structure thereof are not broken at the stage of mixing. Since the reaction products contribute to the improvement of the water resistance efficiently, the water resistance of the cured hydraulic cement article increases.

The isocyanate compound can be impregnated in the same manner as that employed for the preparation of the resin impregnated cement, or in the same manner as that employed for coating or painting. For example, the isocyanate compound can be impregnated into the intermediate product or the cured article by immersing, roll coating, flow coating, spraying or brushing. The intermediate product or the cured article can be placed under pressure or under vibration using ultrasonic wave to accelerate impregnation of the isocyanate compound into the intermediate product or the cured article when the impregnating procedure or the coating procedure is applied, or after impregnating or coating.

In order to impregnate the isocyanate compound into the intermediate product or the cured article, an isocyanate compound having a low viscosity is preferably employed. Even if the isocyanate compound has a high viscosity, the isocyanate compound can be used after diluting with a solvent capable of lowering the viscosity. The solvent generally employed for the isocyanate compound can be used. Examples of the solvents include acetone, benzene, toluene, nitrobenzene, dibutyl ether, methylethylketone, dioxane, acetonitrile, benzylcyanide, anisole, monochlorobenzene, xylene, butyl acetate, ethyl acetate and tetrahydrofuran. The solvent is preferably selected to match with nature of the isocyanate compound employed.

The catalyst of the isocyanate compound can be previously added to the starting materials containing no isocyanate compound. The catalyst can be impregnated into the isocyanate compound.

The process for preparing a high strength cured cement article may also be carried out by curing a composition of a hydraulic cement, a water-soluble organic polymer or a water-dispersible organic polymer, an isocyanate compound and water, for example, wherein said composition is in the form of a shaped article prepared by shaping the hydraulic cement, the water-soluble polymer or water-dispersible polymer, the isocyanate compound and water.

The hydraulic cement product or the cured article containing the isocyanate compound is preferably heated to accelerate the reaction of the isocyanate compound. The hydraulic cement product or the cured article may be heated under a closed condition to prevent the isocyanate compound from evaporation before the reaction. Although the temperature and time of the heating differs depending on nature of the isocyanate compound and catalyst, the reaction proceeds satisfactorily within 20 hours at a temperature of 100° C.

The obtained cured hydraulic cement article shows a high flexural strength more than 100 kgf/cm$^2$ (approx. 10 MPa), appropriately more than 350 kgf/cm$^2$. The cured hydraulic cement article is improved in water resistance. The surface hardness also increases.

The present invention is further described referring to the following examples without limiting the invention.

EXAMPLES 1 to 6

100 Weight parts (250 g) of alumina cement (Alumina Cement No. 1 produced by Asahi Glass Co., Ltd.) and 3 weight parts (7.5 g) of a partially hydrolyzed polyvinyl acetate (Gosenole produced by Nippon Gohsei Chemical Industry Co., Ltd.) were mixed in a planetary motion mixer for 4 minutes, and to the mixture was added a solution containing 11 weight parts (27.5 g) of water and 0.3 weight part (0.75 g) of glycerol. The mixture was well mixed for 4 minutes.

The resulting mixture was kneaded for 5 minutes using a mixing roll having a rotary ratio of a pair of rolls of 1:1.12 to obtain a sheet-type shaped article having a thickness of approx. 3.4 mm, a width of approx. 160 mm and a length of approx. 180 mm.

The shaped article was then rolled using a calender having a rotary ratio of a pair of rolls of 1:1 to give a rolled article having a thickness of approx. 3.2 mm, a width of approx. 165 mm and a length of approx. 185 mm.

The rolled article was heated under pressure of 30 kgf/cm$^2$ at 80° C. for 10 minutes, and then was left under atmospheric condition having a relative humidity of 50 % at 20° C. for 24 hours for curing. The cured article was dried while keeping the temperature of 80° C. to obtain a cured hydraulic cement article having a thickness of approx. 3.0 mm, a width of approx. 170 mm and a length of approx. 180 mm.

The cured hydraulic cement article was immersed in a vat filled with the isocyanate compound indicated in Table 1 for 30 minutes for impregnating the cement article with the isocyanate compound. After the immersing was complete, the cured hydraulic cement article was wrapped with an aluminum foil and was heated in a dryer kept at a temperature of 100° C. for 20 hours.

The cured article changed to show a slightly deeper color than that before the impregnation. From observation of a section face of the article, it was confirmed that the colored portion was deeper than 0.1 mm on the opposite surface sides. Thus, it was recognized that the isocyanate compound was deeply incorporated into the cured article. The content of the isocyanate compound or the reaction product which was determined according to the change of the weight was 2 to 4 wt. % in terms of the amount of the hexamethylene diisocyanate.

Six test pieces having a width of 20 mm and a length of 180 mm were taken out of the cured article, and the flexural strength was immediately measured for three pieces. Other three pieces were immersed in water placed in a thermostat kept at temperature of 20° C., and the change of weight and length was measured. Three of these pieces were immersed in water for 28 days under the same conditions, and then the flexural strength was measured under wet condition.

The results are set forth in Table 1.

The flexural strength was measured by a three-point bending test. The span was set to 150 mm. The change of the length was measured using a contact gauge (defined in JIS (Japanese Industrial Standard) A-1120). The basic length was determined as 100±1 mm.

In Table 1, "before" means "before immersion in water", and "after" means "after immersion for 28 days" "Change of length" and "Change of weight" indicate average proportions of the change of length and weight after the immersion for 28 days.

TABLE 1

| Example | Isocyanate compound | Flexural strength (kgf/cm$^2$) before | after | Change of length (%) | Change of weight (%) |
|---|---|---|---|---|---|
| 1 | hexamethylene diisocyanate*$^1$ | 1,020 | 830 | 0.01 | 0.7 |
| 2 | tolylene diisocyanate*$^2$ | 680 | 480 | 0.02 | 1.0 |
| 3 | polymethylene polyphenyl isocyanate*$^3$ | 750 | 530 | 0.02 | 3.2 |
| 4 | isocyanate mixture*$^4$ | 930 | 710 | 0.01 | 0.3 |
| 5 | carbodiimide modified isocyanate*$^5$ | 70 | 510 | 0.02 | 1.6 |
| 6 | hydrogenated 4,4'-diphenyl methane diisocyanate*$^6$ | 670 | 450 | 0.01 | 0.3 |

Remarks
*$^1$HDI produced by Nippon Polyurethane Industries Co., Ltd.
*$^2$Colonate T-100 produced by Nippon Polyurethane Industries Co., Ltd.
*$^3$Milionate MR-200 produced by Nippon Polyurethane Industries Co., Ltd.
*$^4$Colonate 1021 produced by Nippon Polyurethane Industries Co., Ltd.
*$^5$Milionate MTL-C produced by Nippon Polyurethane Industires Co., Ltd.
*$^6$Desmodur W produced by Sumitomo Bayer Urethane Co., Ltd.

EXAMPLES 7 TO 10

A high strength cured cement article was manufactured in the same manner as in Example 1, except that the amount of water and the partially hydrolyzed polyvinyl acetate were respectively changed. The amount of the glycerol was tenth (1/10) part of the partially hydrolyzed polyvinyl acetate.

Test pieces were cut from the cured article in the same manner as in Examples 1 to 6, and were examined.

The results are set forth in Table 2. In Table 2, "Polyvinyl acetate" means the amount of the partially hydrolyzed polyvinyl acetate (weight part), and "Water" means the amount of water (weight part). "before", "after", "Change of length" and "Change of weight" have same meanings as in Table 1.

TABLE 2

| Example | Polyvinyl acetate | Water | Flexural strength (kgf/cm$^2$) before | after | Change of length (%) | Change of weight (%) |
|---|---|---|---|---|---|---|
| 7 | 0.5 | 11 | 410 | 330 | 0.02 | 1.5 |
| 8 | 3 | 25 | 620 | 430 | 0.01 | 1.2 |

TABLE 2-continued

| Example | Polyvinyl acetate | Water | Flexural strength (kgf/cm$^2$) before | after | Change of length (%) | Change of weight (%) |
|---|---|---|---|---|---|---|
| 9 | 7 | 12 | 1,560 | 1,100 | 0.01 | 0.3 |
| 10 | 10 | 13 | 1,530 | 1,050 | 0.01 | 0.4 |

EXAMPLE 11

A high strength cured cement article was manufactured in the same manner as in Example 1, except that the impregnation with hexamethylene diisocyanate employed in Example 1 (HDI produced by Nippon Polyurethane Industries Co., Ltd., referred to as "HDI" hereinafter) was done after heating under pressure by means of a rolled article, and heated in a dryer kept at a temperature of 100° C.

Test pieces were cut from the cured article in the same manner as in Examples 1 to 6, and were examined.

The results were shown below.

Before immersion in water
an average flexural strength 760 kgf/cm$^2$
After immersion for 28 days
an average flexural strength 420 kgf/cm$^2$
an average proportion of change of length: 0.20 %
an average proportion of change of weight: 2.1 %

EXAMPLES 12 to 15

A high strength cured cement article was manufactured in the same manner as in Example 1, except that the test pieces were impregnated with a solution which was prepared by dilluting the HDI or the isocyanate compound used in Example 2 (Colonate 1021 produced by Nippon Polyurethane Industries Co., Ltd., referred to as "Colonate 1021" hereinafter) with methyl acetate.

The results are set forth in Table 3. In Table 3, "Isocyanate compound" means the kind of isocyanate compound and the amount (weight part) thereof, and "Ethyl acetate" means the amount the ethyl acetate (weight part).

TABLE 3

| Example | Isocyanate compound | Ethyl acetate | Flexural strength (kgf/cm$^2$) before | after | Change of length (%) | Change of weight (%) |
|---|---|---|---|---|---|---|
| 12 | (HDI) 75 | 25 | 1,060 | 850 | 0.03 | 1.1 |
| 13 | (HDI) 50 | 50 | 920 | 720 | 0.11 | 2.1 |
| 14 | (Colonate 1021) 75 | 25 | 980 | 830 | 0.01 | 0.1 |
| 15 | (Colonate 1021) 50 | 50 | 810 | 630 | 0.11 | 0.9 |

EXAMPLE 16

A high strength cured cement article was manufactured in the same manner as in Example 9, except that the ordinary Portland cement (produced by Ube Industries, Ltd.) was used instead of the alumina cement, and 15 weight parts of water and 3 weight parts of the partially hydrolyzed polyvinyl acetate was used per the weight of the ordinary Portland cement.

Test pieces were cut from the cured article, and were examined.

The results are shown below.

Before immersion in water
an average flexural strength: 710 kgf/cm$^2$

After immersion for 28 days
    an average flexural strength: 400 kgf/cm$^2$
    an average proportion of change of length: 0.26 %
    an average proportion of change of weight: 5.1 %

COMPARISON EXAMPLES 1 AND 2

A cured cement article was manufactured in the same manner as in Examples 1 and 16, except that the cured article was not impregnated with the isocyanate compound and the cured article was not heated in the dryer.

Test pieces were cut from the cured article, and were examined in the same manner as in Examples 1 to 6.

The results are set forth in Table 4. In Table 4. "Hydraulic cement" means the kind of hydraulic cement which was used.

TABLE 4

| Comparison Example | Hydraulic cement | Flexural strength (kgf/cm$^2$) before | Flexural strength (kgf/cm$^2$) after | Change of length (%) | Change of weight (%) |
|---|---|---|---|---|---|
| 1 | alumina | 800 | 400 | 0.32 | 8.3 |
| 2 | ordinary Portland | 310 | 250 | 0.7 | 9.4 |

COMPARISON EXAMPLE 3

100 weight parts (250 g) of alumina cement (Alumina Cement No. 1 produced by Asahi Glass Co., Ltd.) and 3 weight parts (7.5 g) of a partially hydrolyzed polyvinyl acetate (Gosenole produced by Nippon Gohsei Chemical Industry Co., Ltd.) were mixed in a planetary motion mixer for 4 minutes, and to the mixture were added 60 weight parts (150 g) of water, 0.3 weight part (0.75 g) of glycerol and 35 weight parts (87.5 g) of HDI, and the mixture was well mixed for 4 minutes.

The resulting mixture was introduced in a molding frame, and was left in a wet box kept at a temperature of 20° C. After 3 days, six test pieces having a thickness of 3 mm, a width of 20 mm and a length of 180 mm were obtained.

The obtained test pieces were examined in the same manner as in Examples 1 to 6.

The results are shown below.
Before immersion in water
    an average flexural strength 80 kgf/cm$^2$
After immersion for 28 days
    an average flexural strength 90 kgf/cm$^2$
    an average proportion of change of length: 0.07 %
    an average proportion of change of weight: .25 %

We claim:

1. A cured cement article which contains in its voids a reaction product of a water-soluble organic polymer with an isocyanate compound which is impregnated into the voids of the cured cement by applying the isocyanate compound onto the surface of the cured cement article, said water-soluble organic polymer and said isocyanate compound being employed in amounts of 0.1 to 20 weight % and 0.1 to 32 weight %, respectively, per the amount of the cement, and said isocyanate compound being employed in an amount of 10 to 300 weight %, per the amount of the polymer.

2. The cured cement article as claimed in claim 1, wherein said polymer is contained in an amount of 0.3 to 10 weight % per the cement.

3. The cured cement article as claimed in claim 1, wherein said polymer is a partially hydrolyzed polyvinyl acetate.

4. The cured cement article as claimed in claim 1, wherein said polymer has been treated with the isocyanate compound in an amount of 8 to 300 weight % per the amount of the polymer.

5. The cured cement article as claimed in claim 1, wherein said isocyanate compound is selected from the group consisting of monoisocyanates, diisocyanates, triisocyanates, polyisocyanates having four or more isocyanate groups, dimers of said isocyanates, trimers of said isocyanates, modified isocyanates, polyurethane prepolymers, and blocked isocyanates.

6. A process for preparing a high strength cured cement article which comprises impregnating a cured cement organic polymer with an isocyanate compound through the surface of the cured cement article and heating the thus impregnated article to cause a reaction between at least a portion of the polymer and the isocyanate compound.

7. The process as claimed in claim 6, wherein said polymer is contained in an amount of 0.1 to 20 weight % per the cement.

8. The process as claimed in claim 6, wherein said polymer is a partially hydrolyzed polyvinyl acetate.

9. The process as claimed in claim 6, wherein said isocyanate compound is impregnated into the cured cement article in an amount of 10 to 300 weight % per the amount of the polymer.

10. The process as claimed in claim 6, wherein said isocyanate compound is selected from the group consisting of monoisocyanates, diisocyanates, triisocyanates, polyisocyanates having four or more isocyanate groups, dimers of said isocyanates, trimers of said isocyanates, modified isocyanates, polyurethane prepolymers, and blocked isocyanates.

11. The process as claimed in claim 6, wherein said isocyanate is employed in the form of a solution in an organic solvent.

12. A process for preparing a high strength cured cement article which comprises curing a composition of a hydraulic cement, a partially hydrolyzed polyvinyl acetate, an isocyanate compound and water.

13. The process as claimed in claim 12, wherein said partially hydrolyzed polyvinyl acetate is obtained in an amount of 0.1 to 20 weight % per the hydraulic cement.

14. The process as claimed in claim 12, wherein said isocyanate compound is contained in the position in an amount of 10 to 300 weight % per the amount of partially hydrolyzed polyvinyl acetate.

15. The process as claimed in claim 12, wherein said isocyanate compound is selected from the group consisting of monoisocyanates, diisocyanates, triisocyanates, polyisocyanates having four or more isocyanate groups, dimers of said isocyanates, trimers of said isocyanates, modified isocyanates, polyurethane prepolymers, and blocked isocyanates.

16. The process as claimed in claim 16, wherein said isocyanate is employed in the form of a solution in an organic solvent.

17. The process as claimed in claim 15, wherein said isocyanate is employed in the form of a solution in an organic solvent; said partially hydrolyzed polyvinyl acetate is contained in an amount of 0.1 to 20 weight % per the hydraulic cement; and said isocyanate compound is contained in the composition in an amount of 20 to 300 weight % per the amount of partially hydrolyzed polyvinyl acetate.

18. The process as claimed in claim 10, wherein said isocyanate is employed in the form of a solution in an organic solvent; said polymer is a partially hydrolyzed polyvinyl acetate which is in an amount of 0.3 to 10 weight % per the cement; said isocyanate compound is impregnated into the cured cement article in an amount of 20 to 300 weight % per the amount of the polymer.

19. The cured cement article as claimed in claim 5, wherein said polymer is a partially hydrolyzed polyvinyl acetate and is contained in an amount of 0.3 to 10 weight % per the cement, and said isocyanate compound is in an amount of 20 to 300 weight % per the amount of said polymer.

* * * * *